(12) United States Patent
Hanis et al.

(10) Patent No.: US 10,832,210 B2
(45) Date of Patent: Nov. 10, 2020

(54) TRACKING ASSETS WITH A BLOCKCHAIN

(71) Applicant: International Business Machines Corporation, Armonk, NY (US)

(72) Inventors: Thomas T. Hanis, Raleigh, NC (US); Bruce H. Hyre, Cary, NC (US); Jessica G. Snyder, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/299,848

(22) Filed: Mar. 12, 2019

(65) Prior Publication Data

US 2019/0205826 A1  Jul. 4, 2019

Related U.S. Application Data

(63) Continuation of application No. 15/399,267, filed on Jan. 5, 2017, now Pat. No. 10,275,739.

(51) Int. Cl.
*G06Q 10/08* (2012.01)
*G06Q 30/00* (2012.01)

(52) U.S. Cl.
CPC ....... *G06Q 10/087* (2013.01); *G06Q 30/0185* (2013.01)

(58) Field of Classification Search
CPC .......................... G06Q 10/087; G06Q 30/0185
See application file for complete search history.

(56) References Cited

U.S. PATENT DOCUMENTS

| 8,751,806 | B1* | 6/2014 | Adler | H04L 9/3066 |
| | | | | 713/168 |
| 2004/0088231 | A1* | 5/2004 | Davis, Jr. | G06F 16/21 |
| | | | | 705/28 |
| 2006/0174129 | A1* | 8/2006 | Brignone | H04L 9/3236 |
| | | | | 713/181 |
| 2006/0200674 | A1 | 9/2006 | Welker et al. | |
| 2008/0189212 | A1* | 8/2008 | Kulakowski | H04L 9/3271 |
| | | | | 705/50 |
| 2012/0128157 | A1* | 5/2012 | Braun | H04L 9/3247 |
| | | | | 380/270 |
| 2014/0133656 | A1* | 5/2014 | Wurster | H04W 12/08 |
| | | | | 380/270 |
| 2014/0330685 | A1* | 11/2014 | Nazzari | G06Q 10/087 |
| | | | | 705/28 |

(Continued)

OTHER PUBLICATIONS

K. Toyoda, P. T. Mathiopoulos, I. Sasase and T. Ohtsuki, "A Novel Blockchain-Based Product Ownership Management System (POMS) for Anti-Counterfeits in the Post Supply Chain," in IEEE Access, vol. 5, pp. 17465-17477, 2017, doi: 10.1109/ACCESS.2017. 2720760. (Year: 2017).*

(Continued)

*Primary Examiner* — Ashford S Hayles

(57) ABSTRACT

A blockchain of transactions may be referenced for various purposes and may be later accessed by interested parties for ledger verification. One example method of operation may include reading a tag affixed to an asset, transmitting a request to update an asset status of the asset in a blockchain, receiving validation confirmation based on content of the request, and updating the asset status of the asset in the blockchain.

20 Claims, 5 Drawing Sheets

350

(56) References Cited

U.S. PATENT DOCUMENTS

| | | | |
|---|---|---|---|
| 2015/0127434 A1* | 5/2015 | Davis, Jr. | H04N 21/4312 |
| | | | 705/14.5 |
| 2015/0269570 A1 | 9/2015 | Phan et al. | |
| 2015/0278757 A1* | 10/2015 | Walden | C07D 311/80 |
| | | | 235/376 |
| 2016/0085955 A1* | 3/2016 | Lerner | G06F 21/79 |
| | | | 726/20 |
| 2016/0098723 A1* | 4/2016 | Feeney | G06Q 20/065 |
| | | | 705/75 |
| 2016/0098730 A1* | 4/2016 | Feeney | G06Q 20/3825 |
| | | | 705/71 |
| 2016/0162897 A1 | 6/2016 | Feeney | |
| 2016/0164884 A1 | 6/2016 | Sriram et al. | |
| 2016/0253622 A1* | 9/2016 | Sriram | H04L 63/126 |
| | | | 713/179 |
| 2016/0300234 A1* | 10/2016 | Moss-Pultz | G06Q 20/3827 |
| 2017/0046806 A1 | 2/2017 | Haldenby et al. | |
| 2017/0048216 A1* | 2/2017 | Chow | H04L 9/3247 |
| 2017/0060559 A1* | 3/2017 | Ye | H04L 67/12 |
| 2017/0083860 A1 | 3/2017 | Sriram et al. | |
| 2017/0256173 A1* | 9/2017 | Burford | G09B 19/00 |
| 2017/0322120 A1* | 11/2017 | Wang | G01M 99/008 |
| 2017/0336775 A1* | 11/2017 | Tokorozuki | G05B 19/4184 |
| 2017/0373849 A1* | 12/2017 | Donner | H04L 9/006 |
| 2018/0174097 A1* | 6/2018 | Liu | H04L 9/3239 |
| 2018/0255131 A1* | 9/2018 | Stocker | H04L 9/0838 |
| 2018/0328612 A1* | 11/2018 | Sinha | F24F 11/62 |

OTHER PUBLICATIONS

N. Abdullah Shah and M. Arif Wahla, "Secure architecture for RFID enabled supply chain hierarchy," 2010 Eighth International Conference on Privacy, Security and Trust, Ottawa, ON, 2010, pp. 167-172, doi: 10.1109/PST.2010.5593233. (Year: 2010).*

M. Burmester and J. Munilla, "An anonymous RFID grouping-proof with missing tag identification," 2016 IEEE International Conference on RFID (RFID), Orlando, FL, 2016, pp. 1-7, doi: 10.1109/RFID.2016.7488020. (Year: 2016).*

List of IBM Patents or Patent Applications Treated as Related, Mar. 20, 2019.

Thomas T. Hanis et al., "Tracking Assets With a Blockchain", U.S. Appl. No. 15/399,267, filed Jan. 5, 2017.

* cited by examiner

US 10,832,210 B2

TRACKING ASSETS WITH A BLOCKCHAIN

TECHNICAL FIELD

This application relates to tracking assets, and more particularly, to tracking assets with a blockchain.

BACKGROUND

The blockchain may be used as a public ledger to store information. Although, primarily used for financial transactions, the blockchain can store information including assets (i.e., products, packages, services, etc.). The blockchain may be used to establish ownership, provenance, a historical record of status, state, location changes, etc. In operation, tracked assets may include a serial number used to uniquely identify each specific item and that serial number may naturally be a key identifier used in the ledger. However, there may still be fraud or misuse of the ledger when tracking ledger updates for a particular asset. For example, while determining whether a particular source actually has possession of the asset, a fraudulent attempt to control the asset may be submitted from a source that merely has knowledge of the asset's serial number.

SUMMARY

One example embodiment may include a method that comprises one or more of reading a tag affixed to an asset, transmitting a request to update an asset status of the asset in a blockchain, receiving validation confirmation based on content of the request, and updating the asset status of the asset in the blockchain.

Another example embodiment may include an apparatus that includes one or more of a processor configured to read a tag affixed to an asset, a transmitter configured to transmit a request to update an asset status of the asset in a blockchain, and a receiver configured to receive validation confirmation based on content of the request, and the processor is further configured to update the asset status of the asset in the blockchain.

Still another example embodiment may include a non-transitory computer readable storage medium configured to store instructions that when executed cause one or more of reading a tag affixed to an asset, transmitting a request to update an asset status of the asset in a blockchain, receiving validation confirmation based on content of the request, and updating the asset status of the asset in the blockchain.

DETAILED DESCRIPTION

Figure 1:
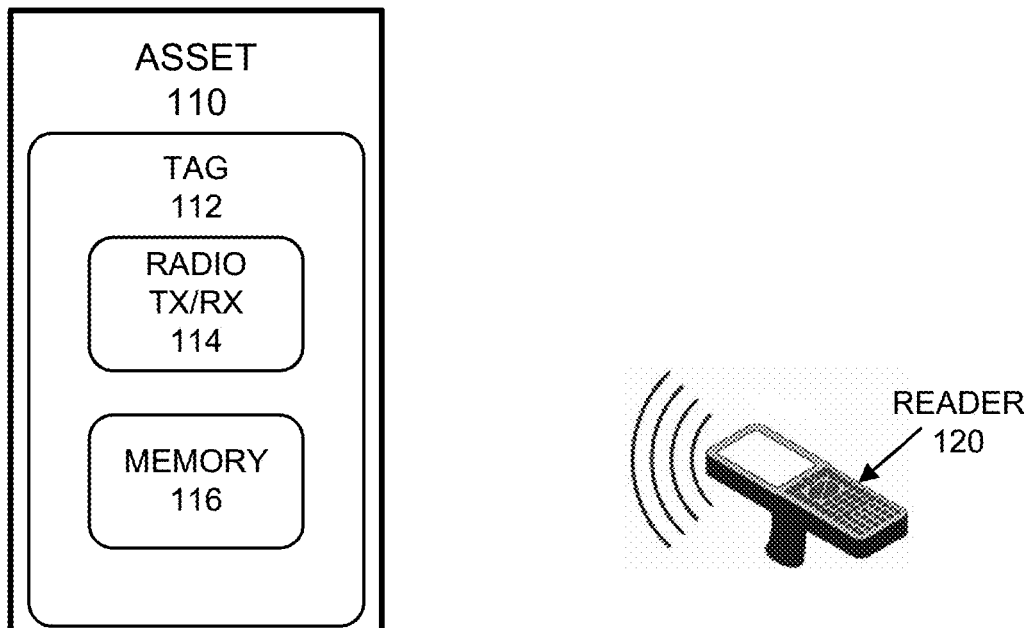
FIG. 1 illustrates an asset identification and update operation using a blockchain according to example embodiments.
Figure 1:
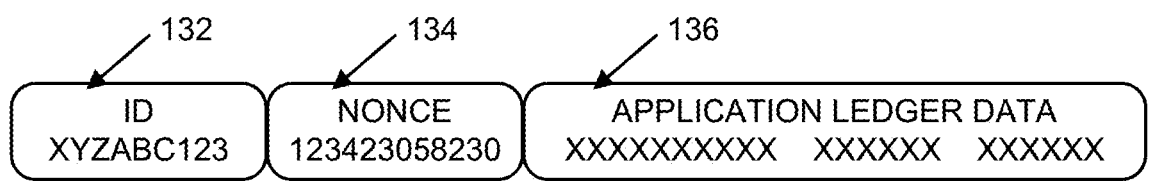

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide storing asset information in a blockchain, to storing asset status information in a blockchain and requiring certain security measures prior to permitting asset status modifications. Further embodiments include using a blockchain public ledger to track assets. Assets may be shipments, products, devices, multiple products, etc. The tracked assets may be identified by a serial number or product identifier (ID) that is used to uniquely identify each specific asset. The serial number can be the main identifier used in the ledger when determining if a ledger update for a particular asset is from a source that actually has possession of the asset. The identifier may be mismanaged by a source that merely has knowledge of the asset's serial number and which is trying to modify/hack/control the asset status remotely based on the serial number. By using serialization technology, such as RFID tags or other wireless tags, which include readable and writable memory, the security and authorization is able to read and write to the tag. This process may include a user memory reading a permanent serial number from the tag and a nonce. The nonce may be a random or pseudo-random number that may only be used once to perform a blockchain transaction.

By including a memory portion of the tag, an identifier and a secret or limited knowledge measure may also be included to provide a second level of validation to ensure that a person attempting a ledger update actually has the asset in their possession and is able to extract the dynamic variable, which in this example is a dynamic nonce. This dynamic nonce, which was updated the last time the asset was identified in a shipment chain, custody chain, or other transfer of ownership or supervision type chain, is configured to periodically scan the identifier information on the wireless or RFID tag affixed to the asset and update a central tracking system with product shipment information. When the nonce is identified from the RFID tag and an asset update occurs in the blockchain, the nonce that is written to the tag after every ledger update is an updated nonce which is unique, new and has not been used to add asset data to the blockchain. Any attempted update to the ledger is required to produce an expected nonce value that is identified from the RFID tag and which is known to the blockchain data. If found to be valid, the next expected nonce value will be updated in the blockchain and in the RFID tag so an entity that identifies the product ID may not have access to the latest nonce stored in the RFID and in the blockchain during a previous asset log operation. In operation, the new nonce is arbitrarily assigned by the reader device after an update to the blockchain.

FIG. 1 illustrates an asset identification and update operation 100 using a blockchain according to example embodiments. Referring to FIG. 1, the asset 110 may be a box, crate, product, etc., and the tag 112, may be a wireless tag with one or more of a processor, a memory, a receiver, a transceiver, and a transceiver. The tag may be a RFID tag that is affixed to the asset 110 via a stick adhesive, magnet or other affixing mechanism. In other embodiments, the tag 112 may be integrated in the body of the asset 110. The tag 112 may include radio communication functions 114 along with a memory 116 that is capable of storing product ID information, nonce data, and other data. In operation, a RF device 120 or reader may be in communication with a computer system (not shown) which can communicate with a blockchain or other data storage systems. When a product is dispatched from a location (such as a factory), received at another location (such as a shipping facility), dispatched to a driver, etc., the product/asset and the asset status may be updated in the blockchain for an immutable record of the asset's existence and updated existence.

The tag memory 116 may contain a nonce value or an empty nonce value if the asset has never been updated (prior to first update). A nonce is a random or pseudo-random number that may only be used once when hashing a blockchain entry for finalization. The reader 120 may scan the tag 112 and extract the product ID 132, the nonce value 134 and other application ledger data 136 which is partially or wholly extracted from the asset 110 or which is substituted from other information sources to complement the asset data when storing the data in the blockchain. Information may include time, number of transactions, asset specification data, blockchain related information, etc.

An assigned serial number can be read from the tag and "user memory" which permits for updateable data to be written to the tag. With this approach, a nonce can be included in the user memory portion 116 of the tag 112 that will provide a second level validation to ensure that a person attempting a ledger update actually does have the asset in their possession and has the serial number and the current nonce value that matches the current nonce value stored in the blockchain, which is dynamically assigned and re-assigned. The nonce that is written to the tag is dynamically updated after every ledger update. The ledger of the blockchain then becomes a validation source for any attempted update to the ledger which includes the expected nonce value which is also stored in the ledger.

In this example, a ledger update may include various pieces of information as validators including the serial number of the tag, which is the asset ID read from the tag, the nonce value read from the tag, and a newly updated nonce value, which is the new nonce value that will be updated on the tag once the previous nonce value is used to validate the blockchain transaction. For standard usages and tracking, an update to the ledger may be performed to identify where an item is with respect to the rest of the logistics chain. The update to the ledger could be performed to establish a pedigree (i.e., anti-tampering) in a supply chain (i.e., provenance). The update could also be performed for operational controls, such as establishing a transit time, dwell time, "cohort" analysis, etc.

With regard to issuing the new nonce, consider two portions of identifying information are needed to update a ledger. One is a serial number, which is fixed and could easily be "known" by various parties. The other is a rotating value (nonce) that changes at every transaction. The nonce is then be available with the object on its tag and is also known to the ledger. In operation, the tag will be read to extract both the serial number and the current nonce. A transaction update to the ledger will be requested with those two pieces of information for validation. In addition, that transaction request will contain a "next nonce" value that the ledger will maintain. The reader device will update the tag with the "next nonce" value. As such, when the tag is read at the next stop on its path, the process continues and the tag's serial and nonce are read, sent to the ledger in a transaction to be validated along with a newly created "next nonce" value that will be updated in the ledger and updated on the tag. The nonce value is found to be valid when the one in the tag matches a same value in the blockchain.

The ledger can then determine for a given serial numbered tag if the nonce value that was provided in the ledger update request was the expected nonce value by comparing that nonce value to the one stored in the blockchain. Also, such a value could only be obtained from the tag itself. If the nonce value is found to be valid, the ledger will update its next expected nonce value reference with the new nonce provided. This permits the next update request to go through the same validation. In order to protect against fraudulent absent-observation ledger updates, the two-factor identification mechanism for tag identification reduces the chances of fraud. In this case, a tag is successfully reference-able to the ledger using two pieces of information including an assigned asset tag serial ID and a rotating identification key (nonce). The nonce is used to provide 'originality' to a given ledger request against replay attacks and confederate systems attempting to record tag observations by knowing only the tag serial number.

In one example, an asset is tracked at location 'A' with tag 'T'. This is an initial tracking operation. At location 'A' an object with tag 'T' is read, the read information from tag 'T' contains tag ID, for example, "12345678" and nonce: <blank>. Location A (reader device, server, etc.) generates a new random number nonce, for example, "858469071245" to be used as the next nonce, and makes an update request to the ledger (blockchain) for object with tag ID "12345678". In this example, the current nonce is blank due to an initial asset identification and logging operation of the RFID tag which has not yet been performed, and then a next nonce is "858469071245". Application specific information for the ledger is included as well as part of the ledger update. The ledger retrieves the latest reference for tag ID "12345678" and in this case the value is null or non-existent which indicates that this is the first entry attempt. No further validation is required. The ledger is updated to include a reference for tag ID "12345678" which also specifies its next expected nonce value as "858469071245". Application specific information is also added to the ledger entry to identify the other transaction details. As a result, location 'A' updates tag T user information, setting the tags' nonce value to "858469071245".

Figure 2:
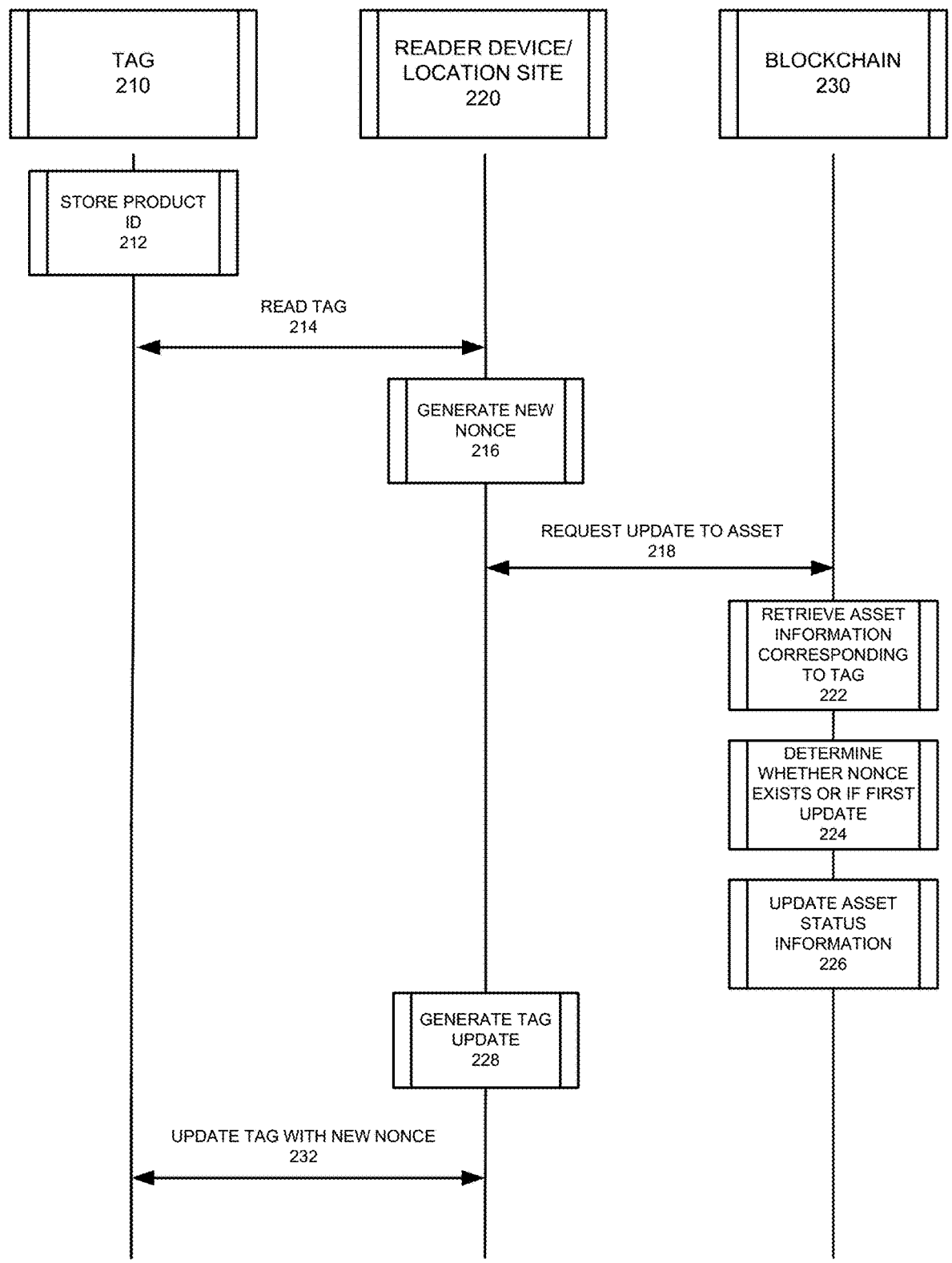
FIG. 2 illustrates an example system signaling configuration platform for updating asset status in the blockchain according to example embodiments.

FIG. 2 illustrates an example system signaling configuration platform for updating asset status in the blockchain according to example embodiments. Referring to FIG. 2, the system configuration 200 includes a tag 210 which is affixed to, near or integrated with the asset to be monitored. The reader device or location site (such as a server) 220 which is part of the location where the asset/tag are currently located and the blockchain 230 are other entities of the example system 200. The blockchain 230 may be stored on a device with a processor and memory. In this example, the store product ID 212 is assigned to the asset and stored in the memory of the tag 210. The asset and tag may be transported to a new waypoint location and the reader device/location site 220 may initiate a tag reading operation 214. The tag reader 220 may retrieve the tag information and any previous nonce values stored in the tag 210. The tag reader may be a wireless access device that receives RF signals from the tag. The reader 220 may generate a new nonce 216 at some point during the communication session with the tag and the blockchain 230. The retrieved tag information is forwarded to the blockchain 230 along with any retrieved nonce values stored in the tag. The information is forwarded as a request 218 and as a result, the blockchain 230 may retrieve any asset information previously stored for the product ID provided 222 and also determine whether the nonce exists or if this is a first update 224. The status information of the asset is updated 226 with the new nonce value created during this asset transaction. The tag update 228 can be made to include the new nonce value now that the previous one is obsolete or now that one has been assigned in the case of a first transaction update to the tag. The nonce value is sent to the tag 232 and stored in the tag 210.

In another example, an asset is tracked at another location 'B' with tag 'T'. The location 'B' reader may read tag 'T'. In this example, the content of the tag will include a previously assigned nonce since this is not the first transaction as in the example with location 'A'. The information read from tag 'T' may include tag ID: "12345678" and nonce: "858469071245". The location 'B' device may generate a new random number, "026254866907" to be used as the next nonce after this transaction with the previous nonce is complete. Location 'B' may make an update request to the ledger for the object/asset with tag ID "12345678", and with a current nonce as "858469071245", and the next nonce will be "026254866907" which replaces the previous nonce value. Application specific information for the ledger is included as well in the request to the ledger for the update. The ledger may retrieve a latest reference for tag ID: "12345678" and determine that the last entry has a private data entry for the next expected nonce with the value "858469071245". The update request includes this same value as the current nonce from the tag read operation so the ledger update request is validated. The ledger is updated to include a new reference for tag ID "12345678" and specifies its next expected nonce value as "026254866907". Application specific information is also added to the ledger entry. For example, location 'B' updates tag T user information which sets the tag nonce value to "026254866907". Application specific information may include a supply chain, an e-pedigree for pharmaceuticals, ownership/provenance for high value items, and general location tracking use cases.

Figure 3A:
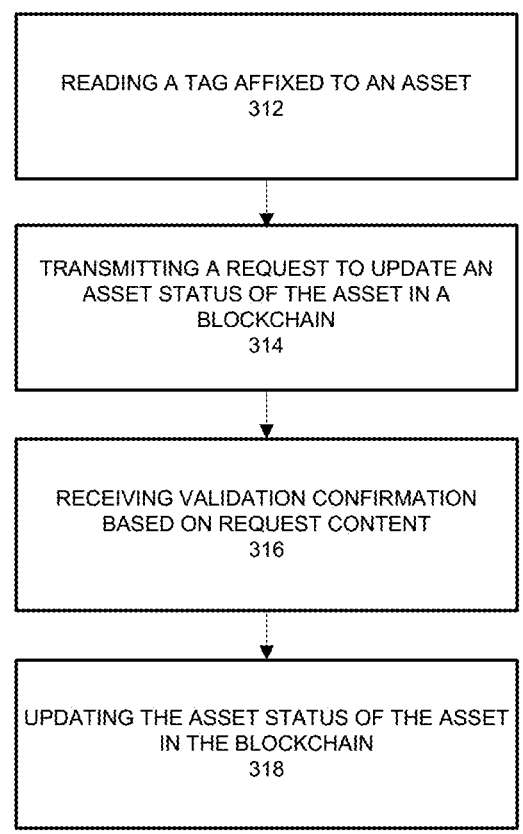
FIG. 3A illustrates a flow diagram of an example method of authorizing and updating assets in the blockchain according to example embodiments.

FIG. 3A illustrates a flow diagram 300 of an example method of authorizing and updating assets in the blockchain according to example embodiments. Referring to FIG. 3A, the method may include one or more of reading a tag affixed to an asset 312, transmitting a request to update an asset status of the asset in a blockchain 314, receiving validation confirmation based on request content 316 and updating the asset status of the asset in the blockchain 318. The request content may include one or more of a tag identifier, a nonce value stored in the tag and a new nonce value for a subsequent update to the blockchain. The validation confirmation is received responsive to transmitting the tag identifier and the nonce value as the request content. The tag may include a radio frequency identification (RFID) component and a memory. The memory stores the tag identifier and a nonce value. An initial value of the nonce value stored in the memory is blank/null prior to any update to the asset status in the blockchain, however, after the asset status of the asset is updated in the blockchain, the method may also include updating the memory to store a new nonce value.

Figure 3B:
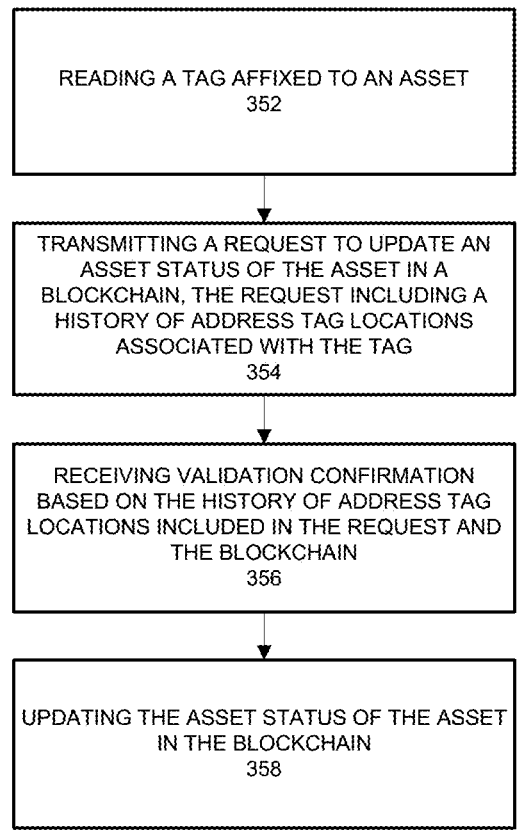
FIG. 3B illustrates a flow diagram of another example method of authorizing and updating assets in the blockchain according to example embodiments.

FIG. 3B illustrates a flow diagram 350 of another example method of authorizing and updating assets in the blockchain according to example embodiments. Referring to FIG. 3B, the method 350 may include one or more of reading a tag affixed to an asset 352, transmitting a request to update an asset status of the asset in a blockchain, wherein the request comprises a history of address tag locations associated with the tag 354, receiving validation confirmation based on the history of address tag locations included in the request and the blockchain 356, and updating the asset status of the asset in the blockchain 358. This alternative approach includes identifying a history of location information stored in the tag and the blockchain as an added security measure necessary prior to receiving access to write and update asset status in the blockchain. If the locations stored in the tag are the same as those stored in the blockchain, the access will be granted pending other security requirements. The locations may be logged each time the RFID tag is scanned, read, accessed at any location. The locations may be added each time to create a list of locations corresponding to the information in the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
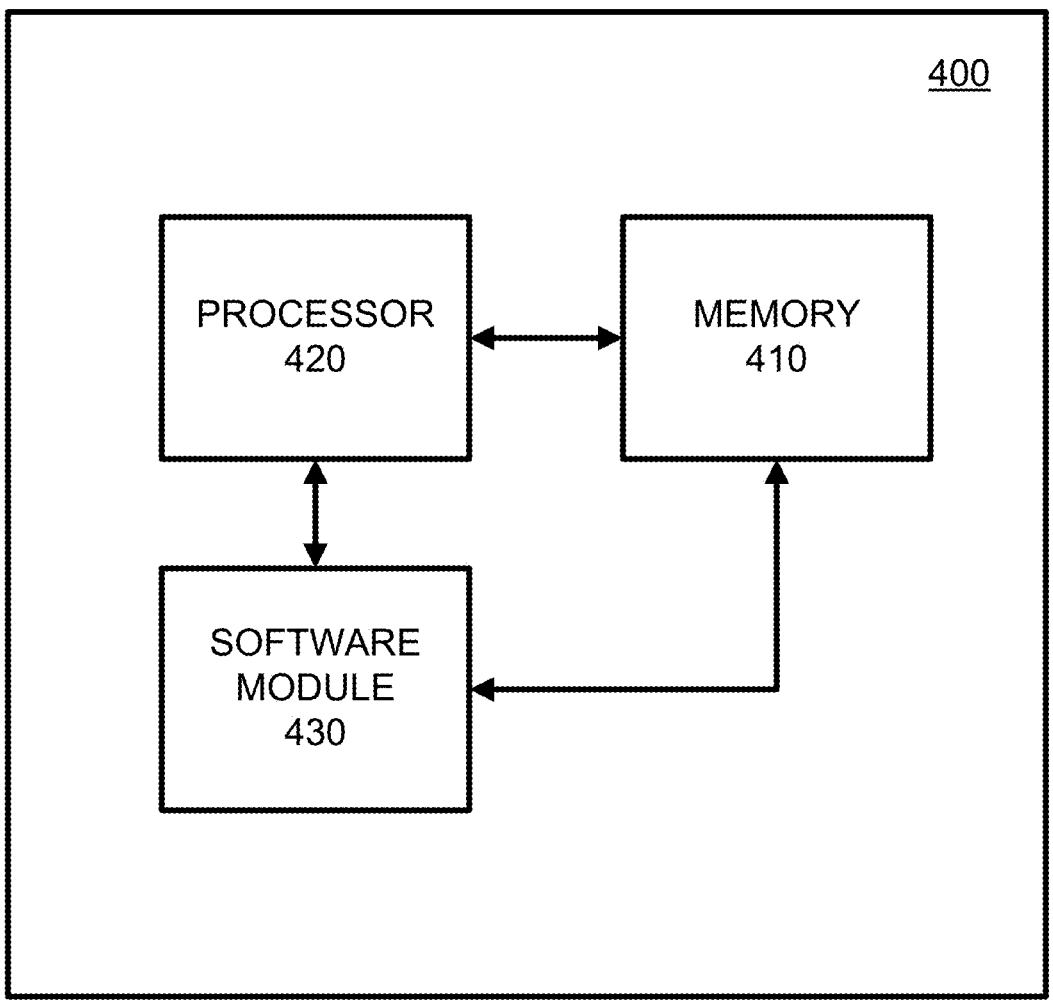
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
reading, via a reader in communication with a blockchain, and from a tag affixed to an asset, a tag identifier associated with the asset, and a nonce value associated with a current location of the asset, wherein the tag identifier and the nonce value are stored in the tag and in locations in the blockchain;
generating, via the reader, a new nonce value associated with a transfer of the asset to a new location, the new nonce value to be stored in a location in the blockchain; and
dynamically updating, via the reader, the tag with an updated asset status from the blockchain and the new nonce value from the blockchain in response to a request including the tag identifier, the nonce value, and the new nonce value.

2. The method of claim 1, comprising:
transmitting, via the reader, the request to update the asset status, of the asset, stored in the blockchain; and
receiving, via the reader, and from the blockchain, a validation confirmation based on the request.

3. The method of claim 1, wherein the validation confirmation is received responsive to transmitting the tag identifier and the nonce value as the request content.

4. The method of claim 1, wherein the tag comprises a radio frequency identification (RFID) component and a memory.

5. The method of claim 4, wherein the memory stores the tag identifier and the nonce value.

6. The method of claim 5, wherein an initial value of the nonce value stored in the memory is blank prior to any update to the asset status in the blockchain.

7. The method of claim 5, wherein after the asset status of the asset is updated in the blockchain, updating the memory to store the new nonce value.

8. A wireless tag reader, comprising:
a processor configured to:
read, via a reader in communication with a blockchain, and from a tag affixed to an asset, a tag identifier associated with the asset, and a nonce value associated with a current location of the asset, wherein the tag identifier and the nonce value are stored in the tag and in locations in the blockchain;
generate, via the reader, a new nonce value associated with a transfer of the asset to a new location, the new nonce value to be stored in a location in the blockchain; and
dynamically update, via the reader, the tag with an updated asset status from the blockchain and the new nonce value from the blockchain in response to a request including the tag identifier, the nonce value, and the new nonce value.

9. The wireless tag reader of claim 8, wherein the processor is configured to:
transmit, via the reader, the request to update the asset status, of the asset, stored in the blockchain; and
receive, via the reader, and from the blockchain, a validation confirmation based on the request.

10. The wireless tag reader of claim 8, wherein the validation confirmation is received responsive to the tag identifier being transmitted and the nonce value as the request content.

11. The wireless tag reader of claim 8, wherein the tag comprises a radio frequency identification (RFID) component and a memory.

12. The wireless tag reader of claim 11, wherein the memory stores the tag identifier and the nonce value.

13. The wireless tag reader of claim 12, wherein an initial value of the nonce value stored in the memory is blank prior to any update to the asset status in the blockchain.

14. The wireless tag reader of claim 12, wherein after the asset status of the asset is updated in the blockchain, the memory is updated to store the new nonce value.

15. A non-transitory computer readable storage medium configured to store at least one instruction that when executed by a processor, causes the processor to perform:
reading, via a reader in communication with a blockchain, and from a tag affixed to an asset, a tag identifier associated with the asset, and a nonce value associated with a current location of the asset, wherein the tag identifier and the nonce value are stored in the tag and in locations in the blockchain;
generating, via the reader, a new nonce value associated with a transfer of the asset to a new location, the new nonce value to be stored in a location in the blockchain; and
dynamically updating, via the reader, the tag with an updated asset status from the blockchain and the new nonce value from the blockchain in response to a request including the tag identifier, the nonce value, and the new nonce value.

16. The non-transitory computer readable storage medium of claim 15, wherein the processor is configured to perform:
transmitting, via the reader, the request to update the asset status, of the asset, stored in the blockchain; and
receiving, via the reader, and from the blockchain, a validation confirmation based on the request.

17. The non-transitory computer readable storage medium of claim 15, wherein the validation confirmation is received responsive to transmitting the tag identifier and the nonce value as the request content.

18. The non-transitory computer readable storage medium of claim 15, wherein the tag comprises a radio frequency identification (RFID) component and a memory.

19. The non-transitory computer readable storage medium of claim 18, wherein the memory stores the tag identifier and the nonce value.

20. The non-transitory computer readable storage medium of claim 19, wherein an initial value of the nonce value stored in the memory is blank prior to any update to the asset status in the blockchain, and wherein after the asset status of the asset is updated in the blockchain, updating the memory to store the new nonce value.

* * * * *